April 12, 1949.  J. HERTRICH  2,466,989
CLUTCH AND BRAKE CONTROL MECHANISM
FOR CENTRIFUGAL MACHINES
Filed Oct. 15, 1946  3 Sheets-Sheet 1
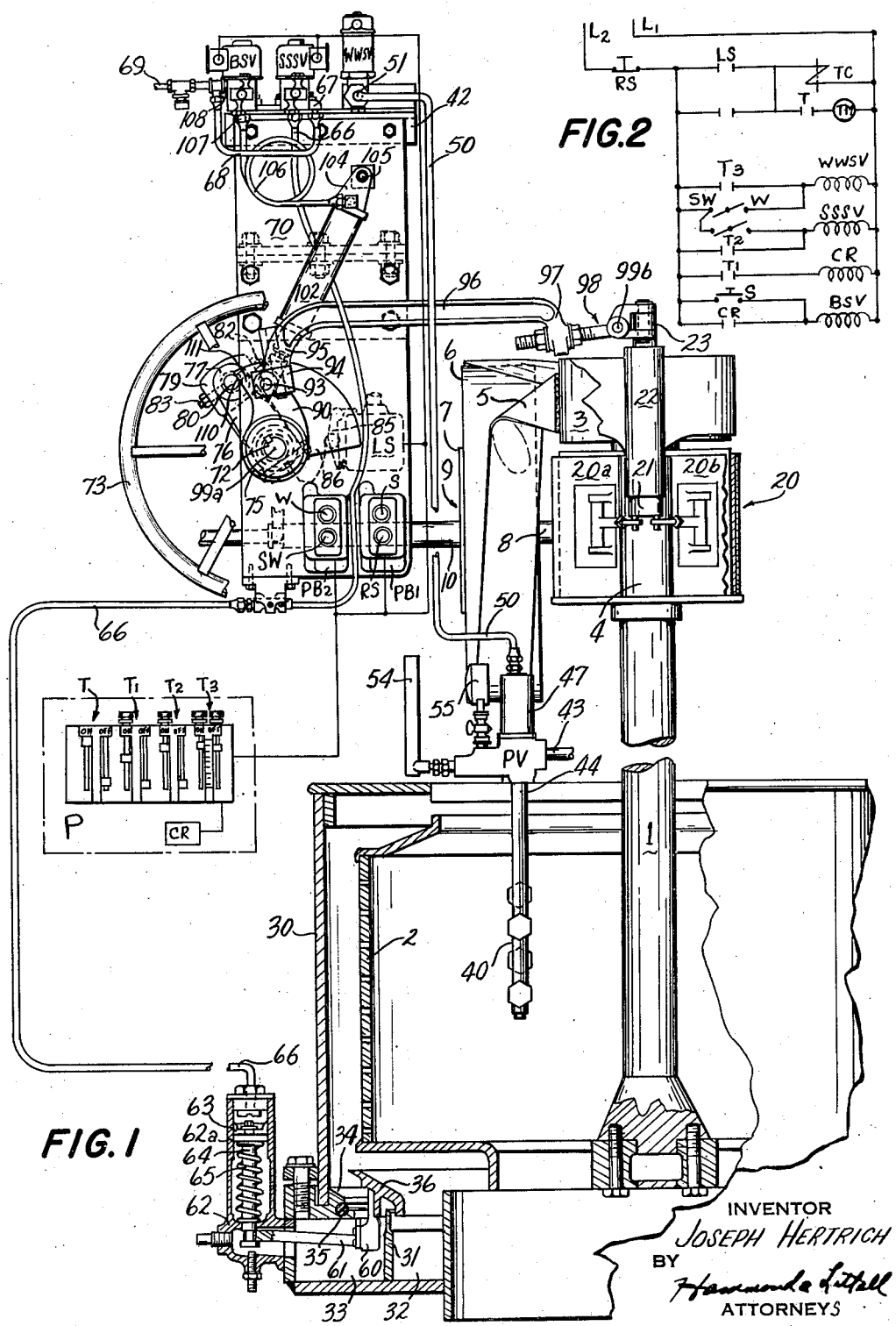
INVENTOR
JOSEPH HERTRICH
BY
Hammond & Littell
ATTORNEYS April 12, 1949.

J. HERTRICH 2,466,989

CLUTCH AND BRAKE CONTROL MECHANISM
FOR CENTRIFUGAL MACHINES

Filed Oct. 15, 1946

INVENTOR
JOSEPH HERTRICH
BY
Hammond & Littell
ATTORNEYS

April 12, 1949.    J. HERTRICH    2,466,989
CLUTCH AND BRAKE CONTROL MECHANISM
FOR CENTRIFUGAL MACHINES
Filed Oct. 15, 1946    3 Sheets-Sheet 3
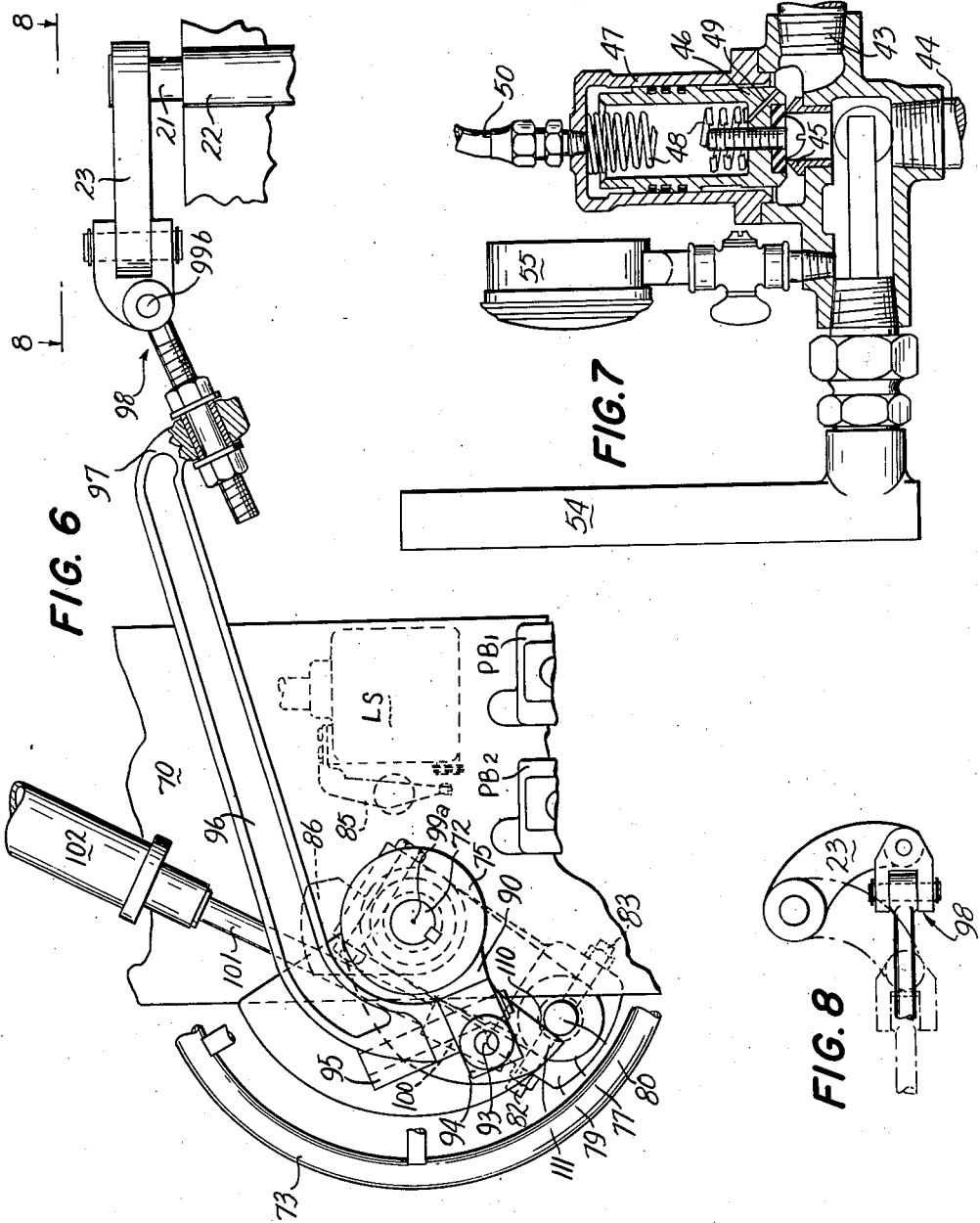
INVENTOR
JOSEPH HERTRICH
BY
Hammond & Littell
ATTORNEYS Patented Apr. 12, 1949

2,466,989

UNITED STATES PATENT OFFICE 2,466,989

CLUTCH AND BRAKE CONTROL MECHANISM FOR CENTRIFUGAL MACHINES

Joseph Hertrich, Hamilton, Ohio, assignor to The Western States Machine Company, Hamilton, Ohio, a corporation of Utah Application October 15, 1946, Serial No. 703,393

8 Claims. (Cl. 192—17)

1

This invention relates to apparatus for the control of centrifugal machines of the type used in sugar manufacture.

As exemplified herein the invention is applied to a "belt driven" suspended centrifugal to which a constantly rotating shaft transmits driving power through a shiftable clutch and a quarter turn driving belt.

The control apparatus herein disclosed provides for manual control of the machine during the phases of its successive cycles when the centrifugal basket is unloaded at low speed, washed out if desired, and re-loaded at a somewhat higher speed; and it provides for automatic control of the machine during the running or centrifuing phase of each cycle, when the loaded basket is accelerated to a high speed, the liquid thus purged from the basket contents is collected in one trough, the contents of the spinning basket are washed with a washing fluid, the resulting wash liquid is collected separately in a second trough, the washing is discontinued, and after a suitable period of drying has ensued the driving system is disconnected and a brake is set to stop the machine.

The general object of this invention is to provide an improved mechanical organization giving operations as above outlined which utilizes new combinations of elements motivated manually, electrically and by fluid pressure to secure the desired conditions and movements of the control apparatus, so as to achieve a less expensive construction of the automatically controlled machine than has existed heretofore and a construction that is easier to operate, easier to adjust to suit operating and processing needs, and fool-proof under the conditions encountered in sugar centrifugal work.

A preferred manner of constructing and using this invention is explained fully in the following detailed description and in the accompanying drawings in illustration thereof, while the parts, improvements or combinations distinguishing this invention will be set forth particularly in the appended claims.

In the drawings:

Fig. 1 is a front elevation, partly in section, showing an assembly of a belt driven centrifugal machine embodying the improved control apparatus;

Fig. 2 is a wiring diagram illustrating a suitable control circuit for the machine;

2

Figure 5:
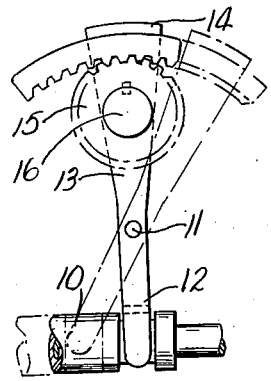
Figure 4:
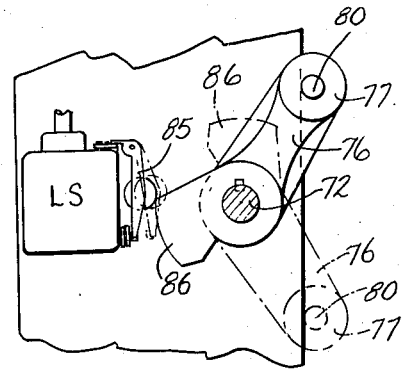
Figure 3:
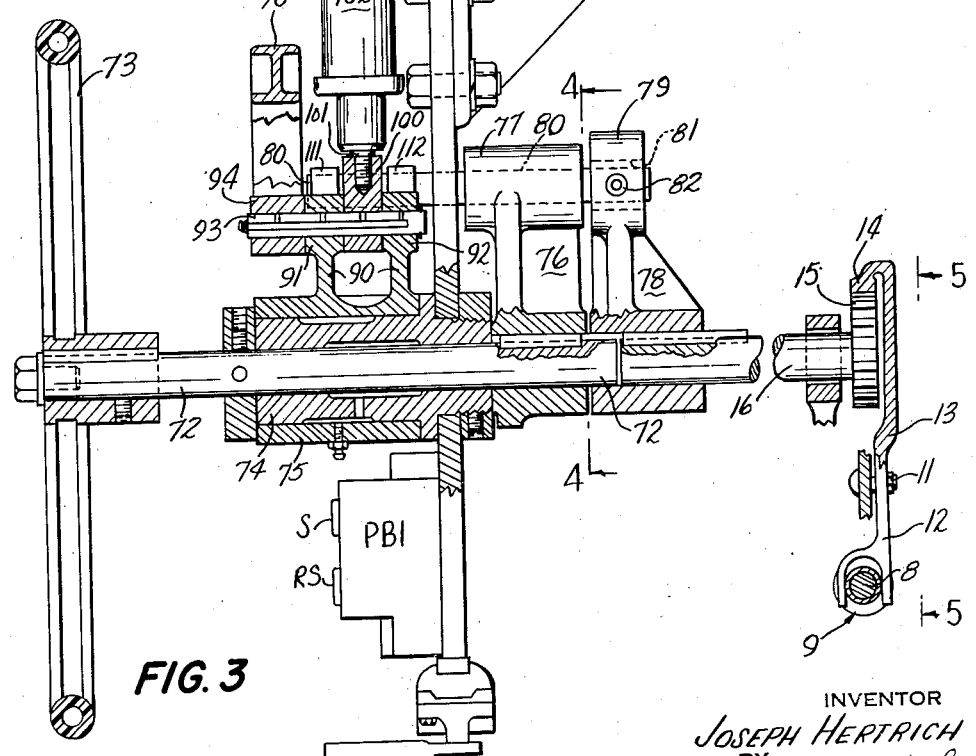
Fig. 3 is a vertical section taken longitudinally of the control shaft, some of the framing and other parts appearing in elevation.

Fig. 4 is a partial view approximately along line 4—4 of Fig. 3 showing an arrangement of the limit switch with the control cam and the interlock pin on the control shaft;

Fig. 5 is a view approximately along line 5—5 of Fig. 3 looking from the rear at the clutch-shifting collar, lever and gear system in relation to the control shaft;

Fig. 6 is a fragmentary front elevation showing the position of parts of the mechanism when the brake is set and the drive is disconnected;

Fig. 7 is an enlarged view, partly in section, of a pressure-responsive sprayer valve in the washing system of the machine; and Fig. 8 is a fragmentary plan view approximately along line 8—8 of Fig. 6 showing the connection of the brake setting yoke with the brake arm.

The drawings show the improvements here claimed embodied in a suspended gyratory centrifugal machine having a basic organization like that illustrated in United States Reissue Letters Patent 22,686 and 22,772. A centrifugal spindle 1 carries a perforate centrifugal basket 2 at its lower end and at its upper end is suspended for gyratory movement within a suitable centrifugal head (not shown). Near its upper end the spindle carries a belt pulley 3 and a brake drum 4, so that the pulley 3, drum 4, spindle 1 and basket 2 revolve as a unit. A driving belt 5 passes around pulley 3, over the customary idler (not shown) giving it a quarter turn, and thence over a driving pulley 6 which has a clutch arm 7 secured thereto and which revolves freely on a line shaft indicated diagrammatically at 8. The line shaft carries a suitable centrifugal clutch mechanism 9 inside the clutch drum 7, this mechanism being not shown because its construction is well known. It suffices to point out that the clutch has a shiftable element such as a sliding collar 10, indicated diagrammatically, which is reciprocable along shaft 8 to engage and disengage the centrifugal clutch. In the left-hand position (Fig. 1) of collar 10 the clutch is to be engaged so that the driving system of the centrifugal is connected or "on," while in the position of collar 10 farther removed from drum 7 the driving system is to be disconnected or "off."

The shifting movement of collar 10 is effectuated by suitable means such as a lever fulcrumed at 11 having one arm 12 formed with a forked end to engage a groove in the sliding collar, and having another arm 13 formed with a gear sector 14 to engage and be moved by a pinion 15 on a control shaft 16.

The brake drum 4 cooperates with an external brake 20 having bands 20a and 20b linked to a brake spindle 21 which extends vertically through a fixed hub 22 to a point of connection with brake arm 23 at the top. The brake bands are set against drum 4 by clockwise pulling of arm 23 as viewed from above (Fig. 8), and the bands are unset or moved to "brake-off" position by opposite movement of arm 23.

The centrifugal basket 2 is surrounded by the usual stationary casing or curb 30, having at its bottom a "ring valve" syrup separator of the type disclosed in Reissue Patent 22,772 of Eugene Roberts. To this end a partition 31 in the curb bottom divides it into inner and outer annular troughs 32 and 33, respectively, and on the curb side wall above the outer trough 33 is an annular ledge 34 carrying a resilient sealing element 35 for seating the outer periphery of an annular syrup deflector 36. The inner portion of this deflector ring extends inwardly over the top portion to the inner side of partition 31. When the deflector ring is seated its outer edge engages and seals with element 35 so that the ring 36 forms with ledge 34 and partition 31 an uninterrupted syrup conducting platform extending from the inside wall of curb 30 into the inner trough 32. When, however, the deflector ring 36 is raised to the position in which it appears in Fig. 1, where it is spaced away from ledge 34 and its seat 35, this platform is interrupted to form an annular space over the outer trough through which syrup then flowing down the curb wall is entrapped into the outer trough 33, the inner portion of ring 36 remaining in its overlapping or substantially sealed relationship to partition 31.

A sprayer 40 of known construction extends into the basket in position to direct a fine spray of washing fluid uniformly against the inside of the basket or its contents when the washing fluid is admitted under pressure at suitable intervals of the operating cycles.

The foregoing represents structures which are known and need not be explained in further detail. It remains to explain how the wash water or other washing fluid delivered through the sprayer 40 may be turned on and off, how the syrup deflecting ring 36 may be moved to and away from its seated position, and how these conditions of actuation of the sprayer and the syrup separator, as well as the on and off (drive connecting and disconnecting) movements of the clutch 9 and the off and on (unsetting and setting) movements of the brake 20, may all be coordinated according to my invention so as to achieve an improved control organization of the type desired.

The sprayer as shown is adapted to be actuated through the combination of a pressure-responsive valve PV located on the top of curb 30 and a solenoid valve WWSV located on control framing 42. Valve PV, as shown in detail in Fig. 7, has an inlet 43 to which wash water is brought under pressure and an outlet 44 connected to sprayer 40. Between the inlet and the outlet there is a valve seat 45 which normally is held closed by a valve plunger 46 that fits for vertical sliding movement in a valve casing 47 and normally is held against seat 45 by a compression spring 48. A bleeder hole 49 in the valve plunger connects the inlet 43 with the interior of plunger 46 and casing 47, which in turn is connected with WWSV through a conduit 50 extending from the top of casing 47 to the entrance of WWSV at 51 (see Fig. 1 and Fig. 3). WWSV may be a solenoid valve of any suitable known construction which normally holds the passage from entrance 51 closed under spring pressure but opens this passage to an outlet or vent 52 (Fig. 3) when an energizing circuit for WWSV is closed.

The bleeder 49 admits fluid pressure from the wash water line 43 to line 50, thus creating equal fluid pressure conditions on the opposite sides of plunger 46 in the normal, inactive condition of the washing system, so that the spring 48 holds valve PV closed and the wash water is "off." Upon the energization of WWSV, however, the pressure in line 50 is released, and since the bleeder causes only a small pressure drop in line 43 the pressure of water in line 43 overcomes the force of spring 48 and opens valve PV to deliver the wash water through line 44 and sprayer 40.

A thermometer 54 may be mounted in valve PV, as shown, to indicate the temperature of the wash water, and a pressure gage 55 also may be mounted in this valve to indicate the pressure of the wash water or other suitable washing fluid.

The syrup deflecting ring 36 (Fig. 1) may be shifted by providing it with a series of circumferentially spaced brackets 60 each having an arm 61 extending radially into a housing 62 mounted at the curb bottom. Only one of these several units is illustrated. The housing 62 forms a cylinder 62a for a piston 63 carried on the upper end of a piston rod 64 whose lower end is secured to arm 61. A compression spring 65 urges the piston 63, rod 64, arm 61 and ring 36 to the upward limit of their vertical movement, where syrup received on curb wall 30 is entrapped into the outer trough 33. At the top of the cylinder 62a is an inlet line 66 through which fluid pressure may be admitted into the cylinder so as to overcome the compression of spring 65 and force the piston 63 and the deflector ring assembly to the downward limit of their movement, where syrup received on curb wall 30 is deflected into the inner trough 32. This fluid pressure is admitted to or restrained from the inlet line 66 by the action of a solenoid valve SSSV which in Fig. 1 is shown mounted on the control framing 42.

SSSV may be a well known form of electrically motivated three-way air valve, which receives air pressure at 67 from a branch 68 of a compressed air supply line 69. When deenergized SSSV transmits this pressure to line 66 so as to keep the syrup separator in its seated, or down position, and when energized SSSV closes off the pressure inlet 67 and connects line 66 with a vent opening, this causing the spring 65 to move the syrup separator to its unseated or raised position. Hence SSSV may be said to be "normally open" so that air pressure normally is transmitted through it to the pistons 63 and normally holds the syrup deflecting ring in its seated position where it deflects syrup flowing down the curb wall 30, after having been purged from the contents of the basket, into the inner trough 32.

The coordinated control of the desired phases of the machine operations is centered at a framing panel 70 depending from the framing 42 and carrying a suitably disposed control shaft section 72 which has a hand wheel 73 secured to its forward end as seen in Fig. 1 and Fig. 3. This control shaft section turns in a hub 74 fixed in panel 70, and this is surrounded by a relatively rotatable control sleeve 75. The shaft section 72 extends beyond hub 74 to the rear of panel 70 where it carries a radial arm 76 keyed thereto. As seen in Fig. 3 a second radial arm 78 is disposed adjacent to and coaxially with arm 76, and this second arm is keyed to the forward end of control shaft section 16, which in turn is aligned axially with the backward end of shaft section 72.

The arm 76 has a head 77 at its outer end formed with a bore parallel to the axis of shaft sections 72 and 16, which bore receives and holds an elongated interlock pin 80 that projects forward beyond the front of framing panel 70 and projects backward into a coaxial bore 81 formed in head 79 at the outer end of arm 78. The diameter of bore 81 is greater than the diameter of pin 80, and a pair of oppositely disposed set screws 82 and 83 is provided in head 79 to bridge the space between the side wall of bore 81 and pin 80 so as to hold head 79 in an adjustably fixed relation to pin 80.

This adjustable interconnection between the split control shaft sections 72 and 16 through their arms 76 and 78 and pin 80 enables the control apparatus on panel 70, though pre-assembled, to be installed easily with its centrifugal machine. The movement of hand wheel 73 from its counterclockwise limit of rotation (as viewed from the front) to its clockwise limit is to act through shaft sections 72 and 16, pinion 15, gear sector 14 and the clutch shifting mechanism to put the clutch at its "drive-on" position. The reverse movement of the hand wheel is to move the clutch to its "drive-off" position, which involves shifting collar 10 from its full line position of Fig. 5 to its broken line position of Fig. 5. It will be evident that the precise position of shaft section 16 and pinion 15 corresponding to the "drive-on" position of the clutch will differ under different conditions of installation, yet the relatively adjustable split shaft arrangement herein provided permits such differences to be compensated, through appropriate settings of the set screws 82 and 83, without changing the angle of movement of hand wheel 73, shaft section 72, arm 76 and pin 80, which movement affects other functions of the control apparatus as hereinafter described.

On the back side of framing panel 70, to the right of shaft section 72 as viewed in Fig. 1, a limit switch LS having a switch arm 85 is mounted in such position that this arm will be depressed to close electrical contacts in the limit switch, by the action of a cam 86 on the hub of arm 76, when 76 is disposed at its "drive-on" position, i. e. at its full line position as seen in Fig. 1 and Fig. 4. When the hand wheel, shaft section 72 and arm 76 are moved to their counterclockwise limit, corresponding to the broken line position of arm 76 and cam 86 in Fig. 4, the cam 86 is disposed away from limit switch arm 85, and the contacts of the limit switch then are open. These contacts form part of the energizing circuit for an electrical timing control system hereinafter described.

From what has been described it will be evident that the movement of clutch 9, through the hand wheel and control shaft, to "drive-on" position is accompanied by closing movement of the limit switch through the action of cam 86, while the reverse movement away from "drive-on" position is accompanied by opening of the limit switch. These drive-on and drive-off movements of the hand wheel can take place whenever desired, so that the driving action upon the centrifugal can be established and interrupted at will to secure, through jogging of the clutch, any low speeds of rotation of the basket 2 that may be desired for unloading the basket or for reloading it with a uniform wall of material to be processed. The concurrent closing and opening movements of the limit switch LS result in the timing control system staying energized to perform its functions only when the driving clutch is left engaged to go through a running or centrifuging period of the machine.

The control sleeve 75 in front of panel 70 carries a radial arm 90 formed with axially spaced end hubs 91 and 92 which receive a connecting pin 93 that forms a connection for two other elements. At its forward end pin 93 carries pivotally a connecting block 94 secured to the left-hand end 95 of a brake connector yoke 96. This brake yoke extends transversely across the front of panel 70 to a point of connection of its right-hand end 97, through an adjustable rod and swivel block connection 98, with the end of the brake arm 23. Secondly, an intermediate portion of connecting pin 93 between the hubs 91 and 92 holds pivotally a block 100 secured to the end of the piston rod 101 of an air cylinder 102. This air cylinder extends upwardly from its point of connection with pin 93 and is anchored pivotally at its base 104 on a pin 105 secured to the framing panel 70. Thus, the sleeve 75, arm 90, brake yoke 96 and piston rod 101 of cylinder 102 must move together as a unit having a common center at the center of the connecting pin 93.

This center can describe an arc of rotation about the common axis of sleeve 75 and shaft section 72, from a clockwise limit of movement corresponding to the full line position of Fig. 1, in which the brake arm 23 is positioned to hold the brake 20 in released or "brake-off" position, to a counterclockwise limit of movement, corresponding to the position shown in Fig. 6, in which the brake arm 23 has been moved to hold the brake in its "set" or "on" position. The radial arm 90 on sleeve 75 thus constitutes a brake setting arm, and the air cylinder 102 constitutes a brake setting air cylinder which acts to move the brake element to "brake-on" position upon the admission of compressed air through a fluid pressure line 106 connected to this cylinder at one end and connected at its other end to a pressure outlet 107 of a solenoid valve BSV mounted on the framing 42. BSV may be a three-way solenoid valve of known construction. It receives air under pressure from a branch line 108 of the compressed air supply line 69, and it preferably is organized so as to vent the fluid pressure line 106 when deenergized and to transmit fluid pressure from line 108 to line 106 and into cylinder 102 when energized as hereinafter described.

From Fig. 1 and Fig. 6 it will be seen that in the "brake-off" position of the brake setting mechanism the center of the connecting pin 93 lies at a point far to one side of a straight line between the axis $99a$ of arm 90 and sleeve 75 and the axis $99b$ of articulation of yoke 96 to the brake arm 23. In the "brake-on" position of this mechanism the center of the connecting pin 93 lies slightly to the other side of that straight line. Accordingly, when the mechanism has been moved to its "brake-on" position it is held there by a toggle locking action, despite any pull that may be exerted by the brake or brake arm upon the yoke 96. It will be noted, further, that an operator attending the machine may unset the brake manually at any time by simply grasping yoke 96 and moving it upwardly and to the right by hand, and the reverse hand movement of yoke 96 can be effectuated at any time to move the mechanism from the "brake-off" position of Fig. 1 to the "brake-on" position of Fig. 6.

The described movements of the brake setting mechanism are coordinated or interlocked as required with the described movements of the clutch shifting mechanism through the relationship between the forward extension of the interlock pin 80 and a radial abutment or cam 110 provided by extensions 111 and 112 of the brake setting arm 90. As seen in Fig. 1, the hand wheel 73, the control shaft sections 72 and 76, the arms 76 and 78 and the pin 80 are located at their clockwise limit, corresponding to the "drive-on" position of the clutch, and the brake setting mechanism is in "brake-off" position. If now the brake setting mechanism is moved to "brake-on" position by action of the air cylinder 102, or by hand movement of the brake yoke 96, the abutment 110 engaging the forward extension of pin 80 will first move that pin counterclockwise, thus thrusting arms 76 and 78, shaft sections 72 and 76 and the clutch shifting mechanism away from "drive-on" position. The parts then assume the relative positions shown in Fig. 6, where the drive is off and the brake is on. If, then, the hand wheel 73 is turned clockwise to move the clutch engaging elements from "drive-off" to "drive-on" position, the arm 76 and pin 80 must also move clockwise so as to thrust the brake setting mechanism from its "brake-on" position of Fig. 6 to its "brake-off" position of Fig. 1 by the action of the forward extension of pin 80 against the cam or abutment 110. This brake releasing movement of the hand wheel can take place whenever the air cylinder 102 is vented through the solenoid BSV. Having taken place, the brake stays released in the position of Fig. 1, and the hand wheel 73 then may be moved freely, without resistance, to establish a neutral condition of the machine with the drive off and the brake on, or to have the brake off and the drive on, or to jog the driving clutch.

It remains to describe the manner of electrical control of the system. This involves the limit switch LS, the solenoids BSV, SSSV and WWSV and electrical push button devices PB1 and PB2, all on the control framing, as well as an electrically connected timer and relay panel P mounted elsewhere. In the use of several like machines to process the same grade of material, panel P preferably is remotely disposed at a location accommodating the like panels of the several machines. Panel P carries adjustable time relays or time delay switches, preferably several of them in a composite unit such as the known "Multiflex" type timer, although separate timers or time delay switches may be used for each of the timing functions if desired. The panel also carries a relay CR for holding a control circuit.

Push button device PB1 comprises two buttons S and RS. S is a "stop" button having normally open contacts in a circuit to BSV whereby, upon pushing button S. BSV will be energized to cause immediate disconnection of the driving clutch and setting of the brake of the machine, irrespective of the then existing condition of operation of the automatic timing control system. Button RS is a "reset" button having normally closed contacts in one of the two lines, L2 or L1 (Fig. 2), of the electrical control circuit, whereby upon pushing RS the control circuits are all opened and resetting of the timer and relay elements results, accompanied by deenergization of SSSV and BSV and the release of air pressure from the brake cylinder 102.

Push button PB2 has two buttons W and SW, both interlocked and connected in the circuit to WWSV, and also in the circuit to SSSV if desired, so that upon depressing button W contacts will be closed to start applying wash water through the sprayer 40, with concurrent unseating of the syrup deflector 36 if desired, and upon depressing button SW the same contacts will be opened to stop the washing and re-seat the syrup separator.

The "Multiflex" type timer is well known and need not be described in detail, except to point out that the form diagrammed comprises four timing contacts or circuits T, T1, T2 and T3 connected, respectively, with the timer's own motivating mechanism, control relay CR, SSSV and WWSV; and each of these contacts or circuits can be set, by the adjustment of an "on" detent and an "off" detent with respect to a timing scale, so that the timed action or circuit closing will occur at any desired interval in relation to starting the timer, according to the setting of the "on" detent, and will terminate at any desired interval in relation to starting the timer, according to the setting of the "off" detent. If the "on" detent is placed above the upper limit of the scale, its corresponding contact is closed when the timer is started, or energized, and if the "off" detent is placed below the lower limit of the scale it is inactive, so that its corresponding circuit, having been closed according to the setting of the "on" detent, stays closed until the timer is deenergized.

To illustrate the timer settings, it may be assumed that the machine described is to be used for processing a sugar massecuite which requires 60 seconds of purging, followed by 20 seconds of washing, followed in turn by 20 seconds of drying before disconnecting the driving power and setting the brake to stop the machine; also, that the syrup separator should be shifted from its seated to its unseated position 5 seconds after starting the washing, in order to collect "wash syrup" separately from "green syrup," and that the syrup separator should be reseated before the stopped machine is reloaded for another cycle.

In such a case, the "on" detent of element T is set at the top of the scale, so that the T contacts are closed to energize the timer motor TM when the timer coil TC is energized, and the "off" detent of T may be set near the bottom of the scale so as to deenergize the timer motor in the event of an abnormally long period of inattention to the machine after it has completed the automatic phase of an operating cycle. The "on" detent of the element T1 is set at a 100 second interval from the top of the scale, the "off" detent being left inactive. The "on" detent of element T2 is set at a 65 second interval, the "off" detent being left inactive. The "on" detent of element T3 is set at a 60 second interval; and the "off" detent of this element is set at an 80 second interval.

The complete cycle of operation will now be described:

Assume that the hand wheel has just been turned to its clockwise limit as above mentioned, the loading of basket 2 having been just completed, or having started upon so turning the hand wheel so as to take place during acceleration. The driving clutch 9 has thus been engaged, and the limit switch LS has been closed by cam 86; so the machine proceeds to accelerate to its full running speed and the timer proceeds to operate due to the closing of contacts LS and T (Fig. 2).

After 60 seconds of purging, the timer contacts T3 are closed with the effect of energizing WWSV, whereupon the pressure in line 50 is released and wash water flows under its own pressure through valve PV and sprayer 30 to wash the wall of purged material in basket 2.

Five seconds after the start of washing the timer contacts T2 are closed with the effect of energizing SSSV, which vents the pressure line 66 and causes the syrup deflecting ring 36 to be raised by springs 65 to its unseated position, whereupon the "wash syrup" received on curb wall 30 flows down over ledge 34 into the outer trough 33, the "green syrup" previously purged from the basket having been collected previously in the inner syrup trough 32.

Twenty seconds after the start of washing, or 80 seconds after the timer was energized, the timer contacts T3 are reopened to terminate the washing period and start a drying period. This drying period continues for 20 seconds while the sugar is spun at the full speed of the machine, and at the end of this period the timer contacts T1 are closed with the effect of energizing relay CR and causing it to close contacts CR through which BSV is energized. BSV then transmits air pressure from 69 through line 106 into the air cylinder 102, whereupon the air cylinder operates to thrust connecting pin 93 counterclockwise, and through the abutment face 110 of arm 90 to thrust interlock pin 80 counterclockwise, from the position shown in Fig. 1 to the position shown in Fig. 6. Thus, the driving clutch 9 is disengaged, the cam 86 is moved away from limit switch LS so that contacts LS open, and the brake yoke 96 is moved to set the brake 20 and to hold it in "on" position by reason of its center of articulation at 93 passing beyond a straight line through the centers at 99a and 99b. The force or pressure thus exerted on the brake is adjustable by adjusting the setting of yoke end 97 with respect to its coupling unit 98.

The machine thereupon decelerates under the action of brake 20, and during this braking period the contacts T1 and CR stay closed, notwithstanding the opening of switch LS, by reason of the relay having closed a holding circuit to the timer coil TC.

When the machine has stopped the operator returning to unload the treated sugar from basket 2 first pushes button RS and then turns the hand wheel 73 clockwise to disengage the brake and engage clutch 9 for a brief interval sufficient to bring the basket to the desired unloading speed, usually about 50 R. P. M. The pushing of button RS opens line L2 of the control circuit, with the effect of deenergizing the timer and relay so that the brake cylinder 102 is vented through BSV, SSSV is positioned to transmit air pressure that re-seats the syrup separator, and the timer and relay CR reset of their own accord to their initial or inactive positions.

The basket 2 having been unloaded in the usual manner, the operator may find it desirable to clean the basket outlets and screens by the application of wash water, and in such event he simply pushes button W to energize WWSV and SSSV, causing a washing spray to be delivered into the slowly revolving basket and causing the resulting washings to be collected in the outer syrup trough 33. To terminate this cleansing of the basket, the operator pushes button SW which deenergizes WWSV and SSSV. Then he may turn the hand wheel 73 clockwise once more to bring the basket to the desired loading speed. Having done this he either moves the wheel counterclockwise momentarily to reset the timer and then turns it clockwise and loads the basket during the acceleration of the new running period, or else he moves the wheel counterclockwise or jogs it so as to load the basket at a more or less regulated speed and turns the wheel clockwise to start the new running period and the timer concurrently at the finish of loading. The automatic phase of the new operating cycle then proceeds in the same manner and with the same timing of its component operations as occurred in the cycle described before.

If abnormal or emergency stopping of the machine is desired at any time during its operation, the operator may simply press button S. This closes a circuit to BSV, which acts to admit air pressure into cylinder 102 and cause immediate drive connection and brake setting. In the event of failure of the electrical power supply or of the supply of air pressure for the controls, the operator can bring about an emergency stopping of the machine by simply grasping the brake yoke 96 and moving it to "brake-on" position as above described.

The assembly on the control framing 42 and 70, comprising the hand wheel, control shaft section 75, arm 76, pin 80, control sleeve 75, connecting pin 93, air cylinder 102, solenoid valves BSV, SSSV and WWSV, push button devices PB1 and PB2 and limit switch LS, can be prefabricated and transported as a unit for simple installation in connection with existing belt driven centrifugal machines. The elements of control panel P also are quite simple to assemble and install. The construction and organization of the various control elements, and the combination of electrical, fluid pressure and manual motivations employed for their working, bring about ease of operation of the controlled machine and render its operation foolproof under the conditions encountered in heavy centrifugal work.

It is to be understood that the detailed description and the accompanying drawings are illustrative and that the improvements herein disclosed may be embodied in various forms of construction within the scope of the appended claims. For example, another embodiment using some of the improvements herein disclosed is shown in my co-pending application, Serial No. 703,392, filed October 15, 1946.

I claim:

1. In centrifugal apparatus comprising a driving system having a drive control element movable to "drive-on" and "drive-off" positions, a brake having a brake control element movable to "brake-on" and "brake-off" positions, a rotatable control shaft connected with said drive element to move it, a relatively rotatable control member coaxial with said shaft and connected with said brake element to move it, and coacting abutment elements connected respectively with said member and said shaft and disposed together at the "brake-off," "drive-on" and the "brake-on," "drive-off" positions of the apparatus so that rotation of the shaft to "drive-on" position moves the member from "brake-on" to "brake-off" position and so that rotation of the member from "brake-off" to "brake-on" position moves the shaft from "drive-on" to "drive-off" position, said member having a radial extension, a brake connector articulated at one end to said brake element and at its other end to said extension, the rotation of said member describing an arc for the center of articulation of said end from a point slightly to one side of a straight line between the axis of said member and the center of articulation of said one end to a point far to the other side of said straight line, the brake element being disposed at "brake-on" position when the first-mentioned center is at the first-mentioned point so that the brake is releasably held on through a toggle locking action.

2. In centrifugal apparatus comprising a driving system having a clutch shiftable to "drive-on" and "drive-off" positions, a suspended centrifugal spindle having a brake including a drum on said spindle and a brake control element movable to "brake-on" and "brake-off" positions, a rotatable control shaft mounted to one side and extending transversely of said spindle and connected with said clutch to shift it, a relatively rotatable control sleeve coaxial with said shaft and having a radial arm, a brake connector extending transversely of said shaft and said spindle, articulated at one end to said brake element and articulated at its other end to said sleeve arm, coacting abutment elements connected respectively with said sleeve and said shaft and disposed together at the "brake-off," "drive-on" and the "brake-on," "drive-off" positions of the apparatus so that rotation of the shaft to "drive-on" position moves the sleeve and brake connections from "brake-on" to "brake-off" positions and so that rotation of the sleeve from "brake-off" to "brake-on" position moves the shaft and clutch connections from "drive-on" to "drive-off" position, the rotation of said sleeve describing an arc for the center of articulation of said other connector end from a point slightly to one side of a straight line between the axis of said sleeve and the center of articulation of said one end, to a point far to the other side of said straight line, to provide a releasable toggle locking action for the brake connections.

3. In centrifugal apparatus comprising a driving system having a clutch shiftable to "drive-on" and "drive-off" positions, a suspended centrifugal spindle having a brake including a drum on said spindle and a brake control element movable to "brake-on" and "brake-off" positions, control framing disposed to one side of said spindle, a rotatable control shaft mounted in said framing, extending transversely of said spindle and connected with said clutch to shift it, a relatively rotatable control sleeve mounted coaxially with said shaft and having a radial arm, a brake connector extending transversely of said shaft and said spindle, articulated at one end to said brake element and articulated at its other end to said sleeve arm, coacting abutment elements connected respectively with said sleeve and said shaft and disposed together at the "brake-off," "drive-on" and the "brake-on," "drive-off" positions of the apparatus so that rotation of the shaft to "drive-on" position moves the sleeve and brake connections from "brake-on" to "brake-off" positions and so that rotation of the sleeve from "brake-off" to "brake-on" position moves the shaft and clutch connections from "drive-on" to "drive-off" position, the rotation of said sleeve describing an arc for the center of articulation of said other connector end from a point slightly to one side of a straight line between the axis of said sleeve and the center of articulation of said one end, to a point far to the other side of said straight line, the brake element being disposed at "brake-on" position when the first-mentioned center is at the first-mentioned point so that the brake is releasably held on through a toggle locking action, and an air cylinder anchored to said framing and having a piston rod articulated at its end to said sleeve arm to move said sleeve from "brake-off" to "brake-on" position.

4. Apparatus as described in claim 3, said sleeve arm having a radially extended face forming one of said abutment elements, said shaft carrying a radial arm behind said framing, the other abutment element comprising an elongated pin held in the end of said shaft arm and extending forward parallel to the axis of said shaft into the path of said face.

5. In centrifugal apparatus comprising a driving system having a clutch shiftable to "drive-on" and "drive-off" positions, a suspended centrifugal spindle having a brake including a drum on said spindle and a brake control element movable to "brake-on" and "brake-off" positions, control framing disposed to one side of said spindle, a rotatable control shaft mounted in said framing, extending transversely of said spindle and connected with said clutch to shift it, a relatively rotatable control sleeve mounted coaxially with said shaft and having a radial arm, a brake connector extending transversely of said shaft and said spindle, articulated at one end to said brake element and articulated at its other end to said sleeve arm, coacting abutment elements connected respectively with said sleeve and said shaft and disposed together at the "brake-off," "drive-on" and the "brake-on," "drive-off" positions of the apparatus so that rotation of the shaft to "drive-on" position moves the sleeve and brake connections from "brake-on" to "brake-off" positions and so that rotation of the sleeve from "brake-off" to "brake-on" position moves the shaft and clutch connections from "drive-on" to "drive-off" position, an air cylinder anchored to said framing and having a piston rod articulated at its end to said sleeve arm to move said sleeve from "brake-off" to "brake-on" position, a compressed air supply line to said cylinder, a valve normally closing said line, a control switch mounted on said framing, a cam on said shaft positioned to close said switch at the "drive-on" position of said shaft, and an electrical timing control system connected electrically with said switch, energized by the closing thereof and including timer controlled means connected with said valve to open the same to move the apparatus from "brake-off," "drive-on" position to "drive-off," "brake-on" position.

6. In apparatus as described in claim 5, a control shaft comprising two separate, aligned shaft sections, one section mounted in said framing, having a hand wheel on its forward end and carrying said cam and a radial arm connected with one of said abutment elements, the other section connected with said clutch, and an angularly adjustable interconnection between said shaft sections to permit adjustment of the other in relation to the clutch without changing the positions of said cam and said shaft arm relative to other parts on said framing.

7. In apparatus as described in claim 5, a control shaft comprising two separate, aligned shaft sections, one section mounted in said framing, having a hand wheel on its forward end and carrying said cam and a radial arm behind said framing, the other section connected with said clutch and carrying a radial arm adjacent the arm of said one section, said sleeve arm having a radially extended face forming one of the said abutment elements, the other abutment element comprising an elongated pin held in the end of the arm of said one section and extending forward parallel to the axis of said shaft into the path of said face, the end of the arm of said other shaft section formed with a recess larger than said pin, said pin having a backward extension extending into said recess, and adjustable means on said last-mentioned arm holding the same in adjustably fixed position relative to said backward extension.

8. Centrifugal apparatus comprising control framing having a framing panel, a rotatable control shaft section extending through said panel, a relatively rotatable control sleeve on said shaft section at the front of said panel, said shaft section formed to hold a hand wheel in front of said sleeve, a radial arm on said shaft section behind said panel, a radial arm on said sleeve in front of said panel, a brake connector articulated to said sleeve arm, a fluid pressure cylinder anchored at its base to said panel and having a piston rod articulated to said sleeve arm, said sleeve arm having a radial abutment face, a pin held in said shaft arm extending forward parallel to the shaft into the path of said abutment face, solenoid valve means on said framing, a fluid pressure line from said valve means to said cylinder, a cam secured to move with said shaft arm, and a limit switch positioned on the back of said panel to be moved by said cam to energize and deenergize an electrical system controlling said valve means.

JOSEPH HERTRICH.

No references cited.